US 12,510,446 B2

United States Patent
Hutchens et al.

(10) Patent No.: US 12,510,446 B2
(45) Date of Patent: Dec. 30, 2025

(54) MICROSCOPE MOUNTING SYSTEM FOR CUTTING AND TESTING OF SOFT MATERIALS

(71) Applicants: The Board of Trustees of the University of Illinois, Urbana, IL (US); Purdue Research Foundation, West Lafayette, IN (US)

(72) Inventors: Shelby Hutchens, Champaign, IL (US); Amy Jaye Wagoner Johnson, Champaign, IL (US); Jing-Chen Peng, Vancouver, WA (US); Matthew Guerena, San Diego, CA (US); Marcus Schmid, Rantoul (IL); Cecilia Walsh, Western Springs, IL (US); Tyler Jacob Roberts, Aurora, IL (US); Chelsea Simone Davis, West Lafayette, IN (US)

(73) Assignees: The Board of Trustees of the University of Illinois, Urbana, IL (US); Purdue Research Foundation, West Lafayette, IN (US)

(*) Notice: Subject to any disclaimer, the term of this patent is extended or adjusted under 35 U.S.C. 154(b) by 329 days.

(21) Appl. No.: 18/307,189

(22) Filed: Apr. 26, 2023

(65) Prior Publication Data
US 2023/0349796 A1 Nov. 2, 2023

Related U.S. Application Data

(60) Provisional application No. 63/334,944, filed on Apr. 26, 2022.

(51) Int. Cl.
*G01N 1/28* (2006.01)
*G01N 1/36* (2006.01)
*G01N 3/58* (2006.01)

(52) U.S. Cl.
CPC ........... *G01N 1/286* (2013.01); *G01N 1/36* (2013.01); *G01N 3/58* (2013.01); *G01N 2001/2873* (2013.01)

(58) Field of Classification Search
CPC .......... G01N 1/286; G01N 1/36; G01N 3/58; G01N 2001/2873; G01N 2203/0033;
(Continued)

(56) References Cited

FOREIGN PATENT DOCUMENTS

CN 107144486 A * 9/2017 ............... G01N 3/58
CN 112067466 A * 12/2020

OTHER PUBLICATIONS

Lake, et al., "Measurement of rubber cutting in resistance in the absence of friction", 1978, International Journal of Fracture, vol. 14, No. 5, pp. 509-526.
(Continued)

*Primary Examiner* — Robert R Raevis
(74) *Attorney, Agent, or Firm* — Greer, Burns & Crain, Ltd.; Steven P. Fallon

(57) ABSTRACT

A microscope mounting system includes a sample holder shaped and configured to fit a particular horizontal microscope stage and fix one end of a soft material sample. A blade holder configured to position a cutting blade and connect directly or eventually to the particular microscope or a frame of the particular microscope. A load measurement device is configured to determine a load applied to the cutting blade. A precision adjustment assembly sets positioning of the cutting blade in the horizontal x-y plane and the z vertical plane such that a cutting edge of the cutting blade can be positioned at a focal point of the particular microscope. At least two grips are configured to grip a second end of the soft material sample at at least two discrete locations on opposite sides of the cutting blade when the blade contacts the soft material sample at the focal point. A
(Continued)

tension mechanism can apply tension in the x-y plane to each of the at least two grips.

17 Claims, 9 Drawing Sheets

(58) Field of Classification Search
CPC ... G01N 2203/0053; G01N 2203/0076; G01N 3/04; G01N 3/24; G01N 2001/061; G01N 2203/0092; G01N 1/06; G01N 3/00; G01N 1/04; G01N 2203/00
USPC ....... 600/564, 568; 73/104, 78, 159, 864.41, 73/866
See application file for complete search history.

(56) References Cited

OTHER PUBLICATIONS

Zhang, et al., "Soft Matter: On the relationship between cutting and tearing in soft elastic solids", 2021, The Royal Society of Chemistry, vol. 17, pp. 6728-6741.
Zhang, et al., "Y-Shaped Cutting for the Systematic Characterization of Cutting and Tearing", 2019, Experimental Mechanics, vol. 59, pp. 517-529.

* cited by examiner

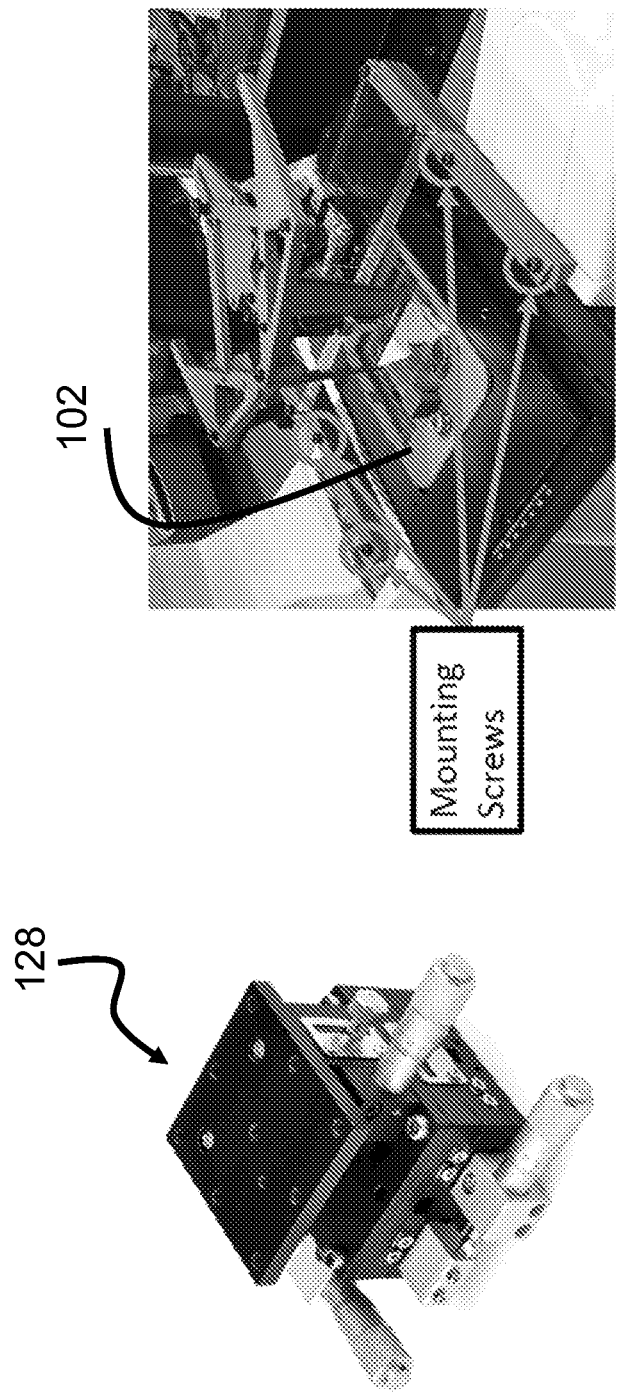

MICROSCOPE MOUNTING SYSTEM FOR CUTTING AND TESTING OF SOFT MATERIALS

PRIORITY CLAIM AND REFERENCE TO RELATED APPLICATION

The application claims priority under 35 U.S.C. § 119 and all applicable statutes and treaties from prior U.S. provisional application Ser. No. 63/334,944 which was filed Apr. 26, 2022, which application is incorporated by reference herein.

STATEMENT OF GOVERNMENT INTEREST

This invention was made with government support under W911NF-20-2-0189 awarded by the Army Research Laboratory. The government has certain rights in the invention.

FIELD

Fields of the invention include microscopy and materials testing systems. A microscope mounting system of the invention provides for repeatable and accurate testing of soft materials, including materials such as rubber and elastomers as well as plant and biological samples.

BACKGROUND

Accurate testing of soft materials is surprisingly limited. Prior methods and devices are generally special-purpose test systems. While cutting has been studied in the context of applications ranging from machine cutting tools to surgical techniques, there is a significant dearth of established and repeatable methods to establish a quantitative relation between the energy required to cut a soft material and the energy required to tear a soft material.

Prior published systems for accurate cut testing of soft materials have typically used a vertical arrangement, with a blade edge arranged in an upward, perpendicular arrangement. Cutting force is then measured as a soft sample is pulled downward into a Y-shape by gripping the sample on opposite sides of the cutting blade. Pubs [1-3].

A recent publication provides an advance and provides a repeatable technique suitable to establish a quantitative relation between the energy required to cut a soft material and the energy required to tear a soft material. Pub [3]. The techniques in that publication provided a number of advantages, including a) Y-shaped geometry that either eliminates or makes nominal any frictional contributions to the measured cutting energy; b) allowance for a varied blade geometry; c) a controlled rate of failure to provide time-dependent soft material testing; d) independently-tunable cutting and tearing energy contributions; and e) a simple expression that captures the cutting energy for a wide range of sample and loading geometries. The testing required a custom cutting instrument having a vertical cutting blade with its edge pointed upward. The blade was attached to a load cell. Weights pulled downward at an angle on opposite sides of the cutting blade. Mere visual observation was used during testing, and data was collected from load cell over time during cutting of a sample at a controlled rate.

PRIOR PUBLICATIONS RELATED TO SOFT MATERIALS TESTING

The following publications describe methods for testing of soft materials.

Pub [1]—Lake, G. J., Yeoh, O. H. Measurement of rubber cutting resistance in the absence of friction. Int J Fract 14, 509526 (1978).

Pub [2]—Zhang, B., Hutchens, S. B. On the relationship between cutting and tearing in soft elastic solids. Soft Matter 17, 6728-6741.

Pub [3]—Zhang, B., Shiang, C.-S., Yang, S. J., Hutchens, S. B. Y-shaped Cutting for the Systematic Characterization of Cutting and Tearing. Exp Mech, 59, 517-529 (2019).

SUMMARY OF THE INVENTION

A preferred embodiment provides a microscope mounting system for cutting and testing of soft materials that includes a sample holder shaped and configured to fit a particular horizontal microscope stage and fix one end of a soft material sample. A blade holder is configured to position a cutting blade and connect directly or eventually to the particular microscope or a frame of the particular microscope. A load measurement device is configured to determine a load applied to the cutting blade. A precision adjustment assembly sets positioning of the cutting blade in the horizontal x-y plane and the z vertical plane such that a cutting edge of the cutting blade can be positioned at a focal point of the particular microscope. At least two grips are configured to grip a second end of the soft material sample at at least two discrete locations on opposite sides of the cutting blade when the blade contacts the soft material sample at the focal point. A tension mechanism can apply tension in the x-y plane to each of the at least two grips.

BRIEF DESCRIPTION OF THE DRAWINGS

FIGS. 1A-1F illustrate a preferred microscope mounting system for cutting and testing of soft materials in accordance with the invention;

DETAILED DESCRIPTION OF THE PREFERRED EMBODIMENTS

Figure 1A:
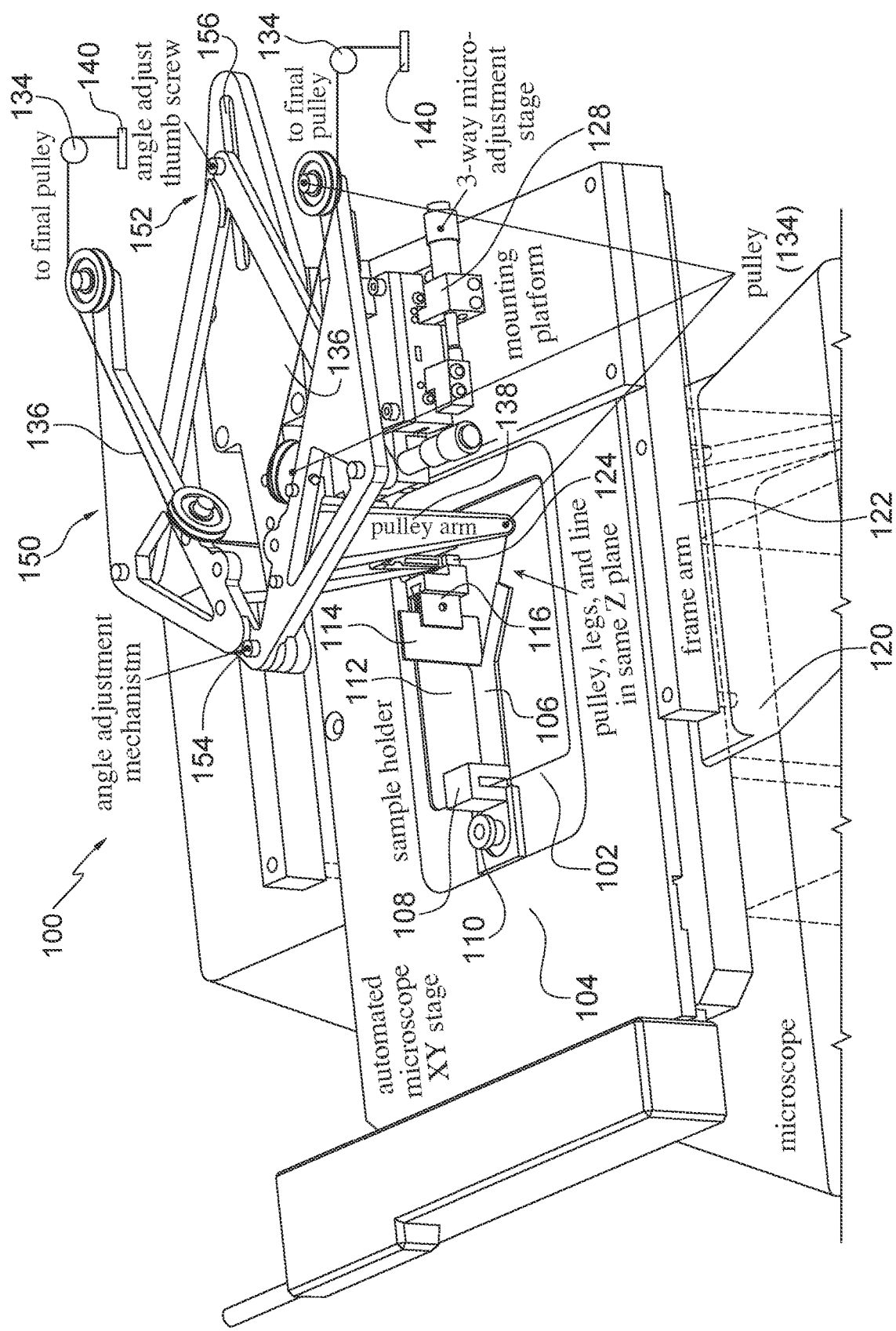
Figure 1B:
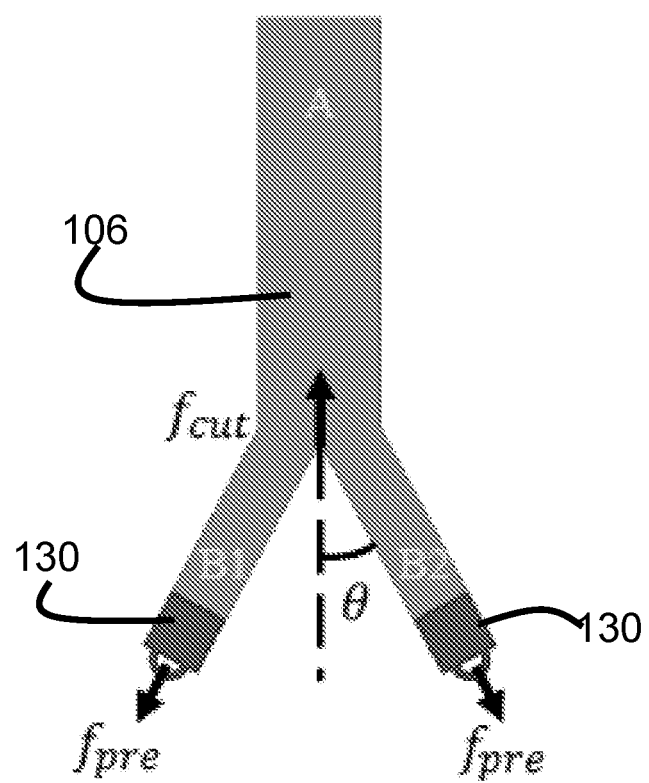

As used herein, horizontal, vertical, and any reference to the x, y, or z direction are to be understood with respect to the force of gravity being directed in negative z direction and all of x, y, and z directions being perpendicular to one another. Thus, the z or vertical direction is along the direction of gravitational force. An x-y or horizontal plane is perpendicular to the z direction.

The invention provides a microscope mounting system for cutting and testing of soft materials that permits precise alignment with the focal objective of a microscope, such as an inverted microscope. The cutting of a sample can be viewed while simultaneously measuring the cutting force as the sample is controllably advanced against a cutting blade. A preferred embodiment includes at least two grips (and preferably only two grips) that preferably equally tension two separate portions of a sample on opposite sides of a cutting location where the cutting blade will contact and cut the sample. The tension applied by the grips is preferably insufficient to cause tearing while the sample is advanced. The force required to advance the sample against the cutting blade provides a measure of the force required for cutting of the soft material sample.

Preferred systems include a sample holder that is shaped and configured to fit a particular horizontal microscope stage. The sample holder is preferably modeled to fit in place of an original slide, petri dish or other sample mount of the microscope. A blade holder fixes the position of a cutting blade and attaches directly or eventually to the microscope or a frame to be aligned over its objective. A precision adjustment mechanism(s) provide for precise positioning of the cutting blade in the x-y plane, as well as in the z direction to permit a cutting edge of the cutting blade at a focal point of the microscope. Adjustment and alignment aids are preferably included for one or both of the sample holder and the blade holder.

Preferred systems can perform Y-shaped cutting tests over an inverted microscope. A horizontal arrangement permits samples to be in a liquid medium during cutting tests. Preferred embodiments can measure cutting force to a 1 mN resolution with data collection rate of greater than 20 Hz. Control permits a cutting angle and symmetry to within 1°. The system can be easy to install and remove from an inverted or other general purpose microscope, e.g. an upright microscope.

Embodiments include a microscope mounting system enables viewing the action of cutting materials (e.g., soft materials) through a microscope (e.g., an inverted microscope) while simultaneously measuring the cutting force.

Preferred systems can perform Y-shaped cutting tests over an inverted microscope stage or in another microscope while measuring the cutting forces. Viewing the material failure can be considered important for understanding why material fails and in characterizing that failure. Measuring cutting forces and understanding the behavior of biomaterials can aid in the diagnosis and treatment of certain diseases. In some embodiments, the mounting system measures the cutting force within 1 mN of accuracy while allowing for the cutting process to be viewed through the objective of an inverted microscope. The load, combined with the Y-shaped geometry, give rise to a 'cutting' energy. This cutting energy measurement provides a unique perspective of the material's fracture behavior that differs fundamentally from traditional fracture tests that pull on a sample. By mounting the test on a microscope, the microstructural changes that play a role in the fracture energy can be simultaneously quantified. For example, when testing polydimethylsiloxane (PDMS), a type of silicone, the cutting energy was calculated to be 131.03 $J/m^2$, which is within the acceptable range of 133±5 $J/m^2$ for this material. The method outlined for silicone can be applied to other soft tissues and bio-membranes to understand their behaviors during failure.

An exemplary Y-shaped cutting method may include a blade being applied to a crack tip of a preloaded test piece. The crack tip may be created before the test begins, forming a test piece with a main body that splits into two "legs." Advantages of cutting methods disclosed herein include, for example: elimination of most frictional contributions to the measured cutting energy, ease of varying blade geometry, ability to control failure rate, ability to alter loading geometry to allow for tuning the cutting and tearing energy contributions, and calculation of cutting energy using a simple expression.

Embodiments of the Y-shaped cutting method can be used further to develop an understanding between cutting and tearing in soft, deformable materials, such as polydimethylsiloxane (PDMS). While the relationship between cutting and tearing is being investigated numerically, there is little knowledge of how the material behaves physically under these failure methods.

Embodiments include microscope mounting system that can perform y-shaped cutting tests over an inverted microscope or other general purpose microscope. The mounting system may allow one to vary a cutting angle and preload, center a razor blade and sample over a microscope objective, and measure cutting force during the test using, e.g., a weighted load cell.

In an embodiment, the mounting system can interface with a small circuit and the NI DAQ system, which may, e.g., be plugged into a computer (e.g., plugged in by using a USB type A to type B cable). In an embodiment, force data may be read and saved directly from a program such as MATLAB.

Preferred embodiments of the invention will now be discussed with respect to experiments and drawings. Broader aspects of the invention will be understood by artisans in view of the general knowledge in the art and the description of the experiments that follows.

FIGS. 1A-1F illustrate a preferred microscope mounting system 100 for cutting and testing of soft materials. A sample holder 102 is shaped and configured to fit a particular horizontal microscope stage 104 and fix one end of a soft material sample 106. The sample holder 102 can include a shaped pressure plate 108 and screw 110 to secure the sample 106. The sample holder 102 has a large open or optically transparent portion 112 to allow a microscope objective to focus on a point where the sample 106 contacts a cutting blade 114 held in a blade holder 116. The blade holder 116 is configured to position the cutting blade 114 and connect directly or eventually to the microscope 120 or a frame 122 of the particular microscope.

A load cell 124 determines a load applied to the cutting blade 114. A precision adjustment assembly (3-way micro adjustment stage) 128 is mounted to the frame 122 and can set positioning of the holder 116 and therefore the cutting blade 114 in the horizontal x-y plane and the z vertical plane such that a cutting edge of the cutting blade can be positioned at a focal point of the microscope 120. Two grips 130 (FIG. 1B) are configured to grip a second end of the sample 106 at two discrete locations on opposite sides of the cutting blade 114 when the blade contacts 114 the soft material sample 106 at the focal point.

A tension mechanism including pulleys 134 and lines 136 can apply substantially equal tension in the x-y plane to each of the at least two grips 130. The tension can be applied at an equal angle from the cutting edge 114. A large majority of tension is applied in the x-y plane, but the tension can include a z component that is preferably a tiny fraction of the x and y component, preferably five percent or less, and more preferably one percent or less. Most preferably, a z component of the tension is small enough such that the sample is maintained in focus during testing.

The two grips 130 are at first ends the two lines 136. The tension mechanism includes an arm 138 for each of the two lines 136 that mounts one of the pulleys 134 such that tension is applied to each of the at least two grips 130 in the x-y plane. Equal weights 140 are attached to second ends of the at least two lines 136 such that the equal weights hang vertically from the second ends of the at least two lines 136 after a final pulley 134.

The tension mechanism of lines 136, pulleys 134, arms 138, etc. is mounted on the precision adjustment assembly 128. It further includes an angle adjustment mechanism 150 that adjusts the angular position of the arms 138. the angle adjustment mechanism 150 includes a slide 152 configured to pivot the arms 138 about a pivot point 154 in response to movement the slide 152 in a slot 156.

Figure 1C:
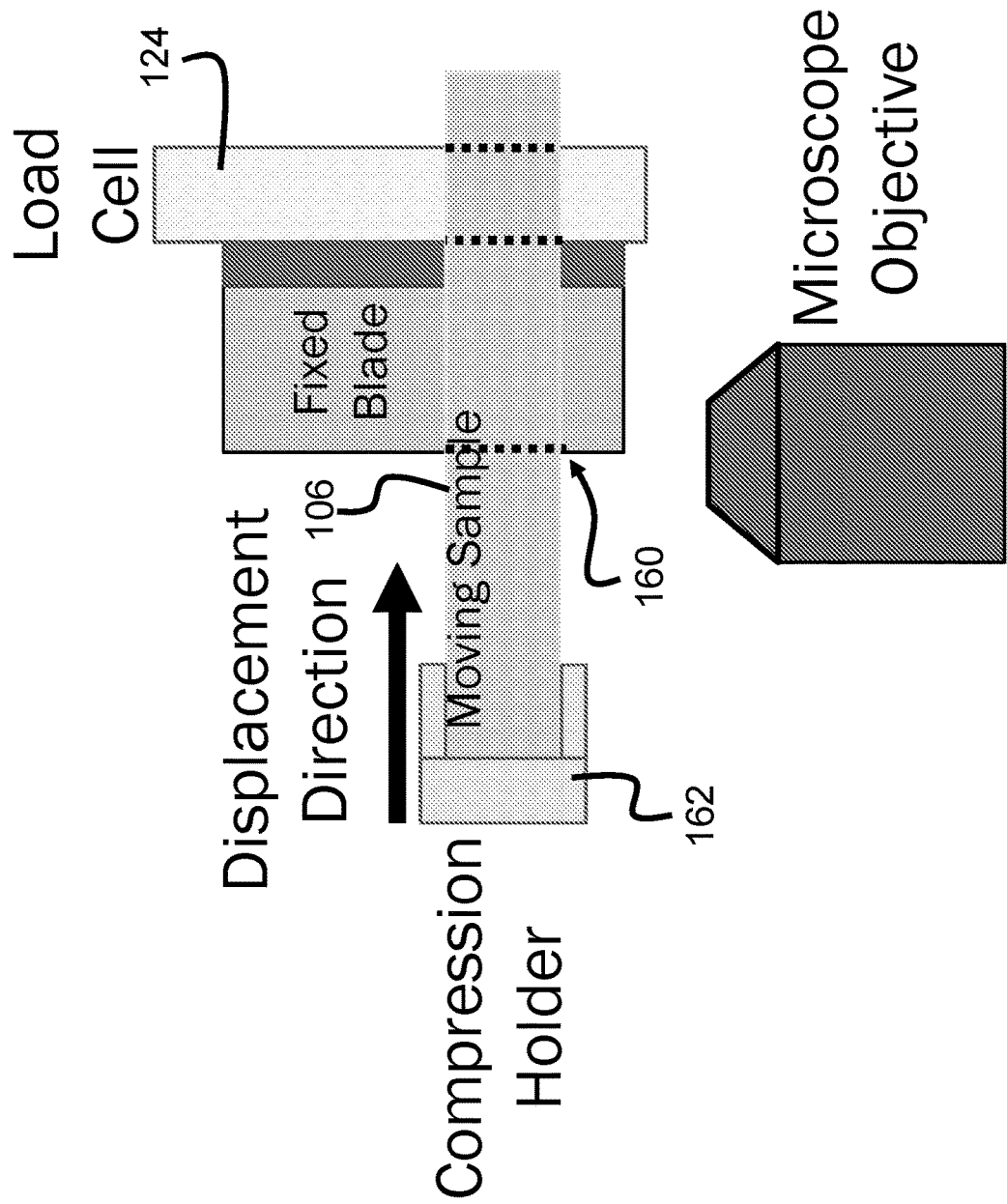
Figure 1F:
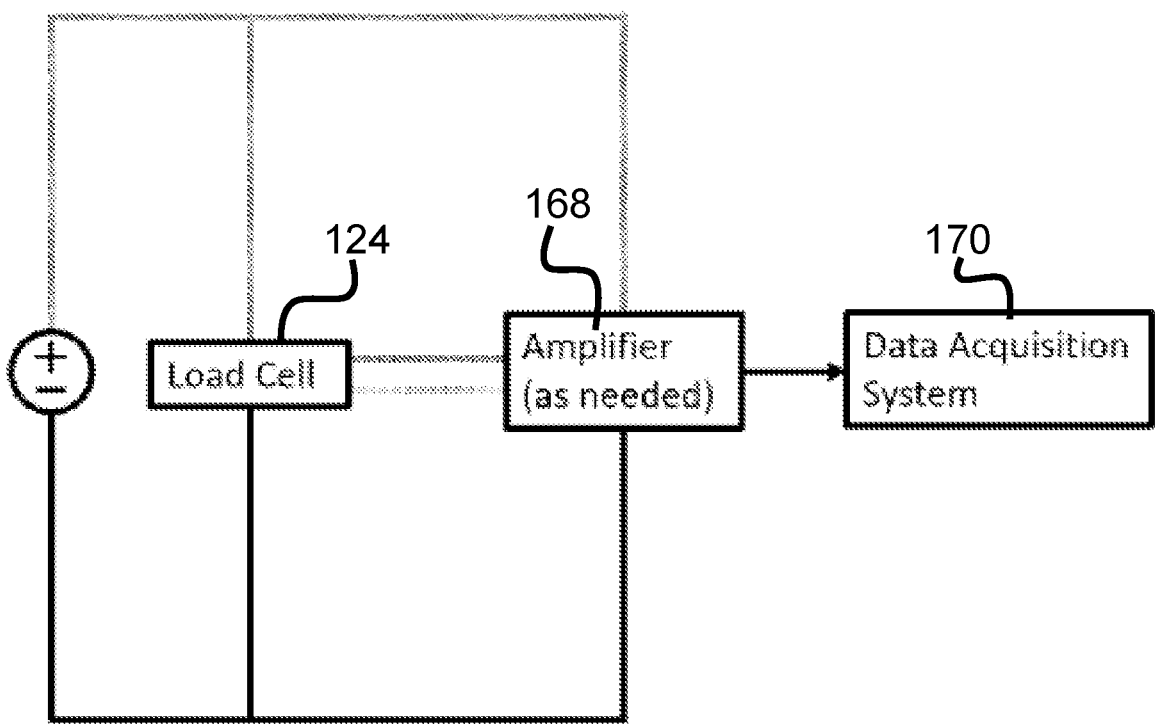

FIG. 1C shows how an edge 160 of the cutting blade 114 can be aligned with the focal point of a microscope objective. Additionally, a compression holder 162 can be used to fix an opposite end of the sample to the sample holder 102. FIG. 1D shows a preferred precision adjustment device that can be used as the precision adjustment assembly 128 and FIG. 1E an example sample holder 102 mounted with 4 screws to a microscope. FIG. 1F shows that the load cell 124 preferably connects through an amplifier 168 to a data acquisition system 170.

Figure 2A:
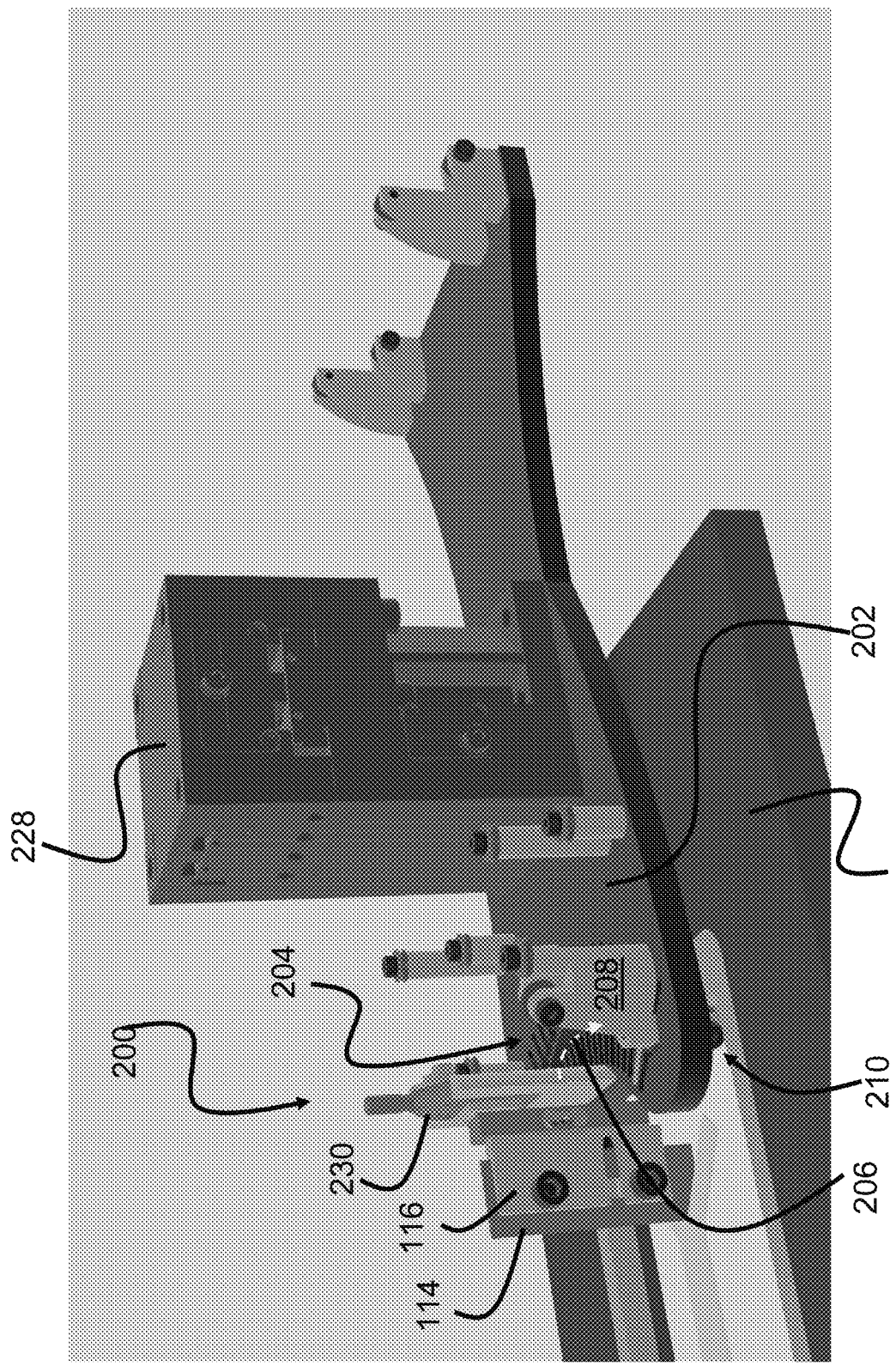
FIGS. 2A-2B illustrate a preferred angle adjustment and tension mechanism for a preferred microscope mounting system for cutting and testing of soft materials in accordance with the invention.
Figure 2B:
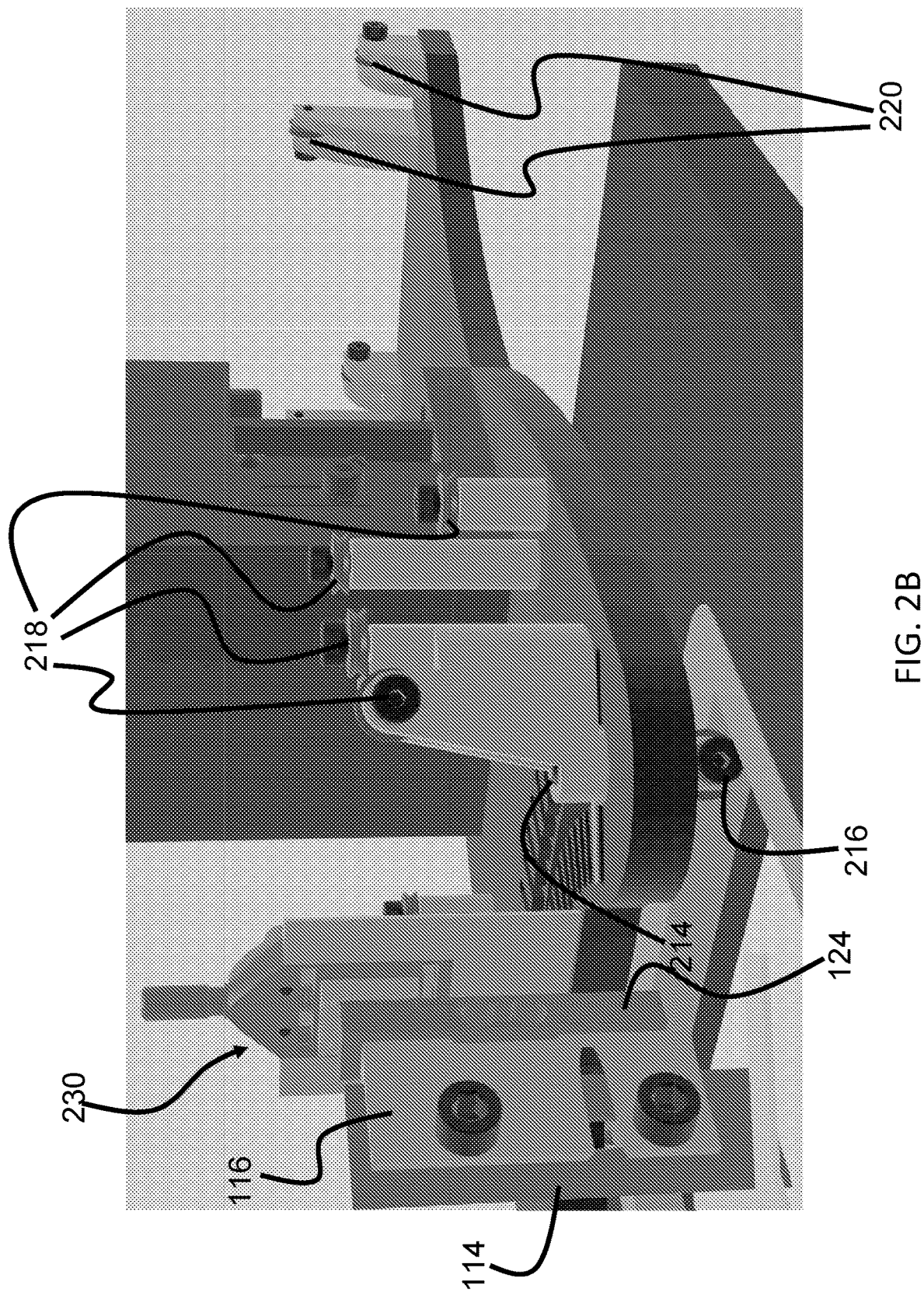

FIGS. 2A-2B show an alternative preferred angle adjustment mechanism 200. The mechanism 200 includes a platform 202 defining a plurality of fixed positions 204 distributed symmetrically along a curved path 206. Two supports 208 integrated with two arms 210 can be fixed into a set of the plurality of fixed positions 204. The fixed positions 204 can be slots and the supports 208 can lock into position with a screw or spring detent, or another mechanism that interfaces with slots. The curved path 206 is defined by an open, curved slot. The supports 208 have a portion above the platform 202 with the arms 210 being below the platform 202. The supports 208 preferably define a lumen 214 through which a line can be threaded from a first pully 216 to intermediate 218 and end 220 pulleys. Weights can hang vertically from a line run over the end pulleys 220. In addition to a precision adjustment assembly (3-way micro adjustment stage) 228, a small linear stage adjustment 230 is provided for precision vertical positioning of the blade holder 116 and blade 114.

Figure 3A:
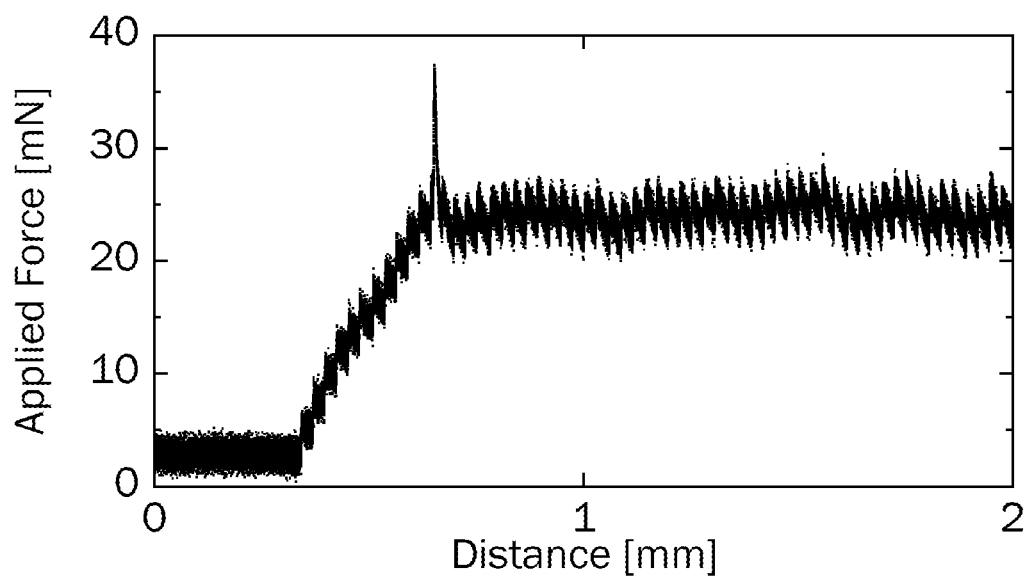
FIGS. 3A-3B illustrate alternative load measurement methods for a preferred microscope mounting system for cutting and testing of soft materials in accordance with the invention.
Figure 3B:
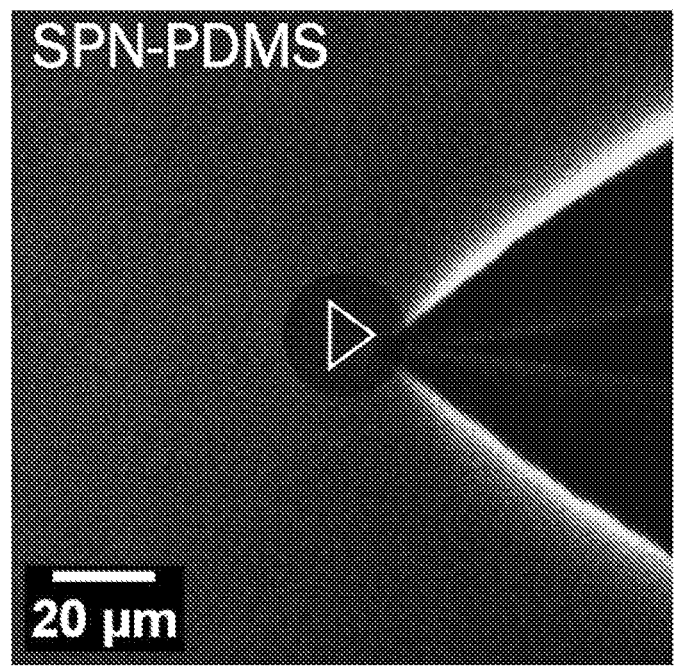

FIGS. 3A-3B show that the load measurement device can be a mechanical load sensor that mechanically measures the load applied to the cutting blade 114 and can output force exerted to cut sample as function of time (FIG. 3A). This force can be used to calculate cutting energy. FIG. 3B shows that a load measurement device can be an optical sensor that images the cutting blade and determines stress as a function of blade radius. Optical fluorescence response intensity is preferred and can be used to acquire data that quantifies stress as a function of blade radius.

Figure 4:
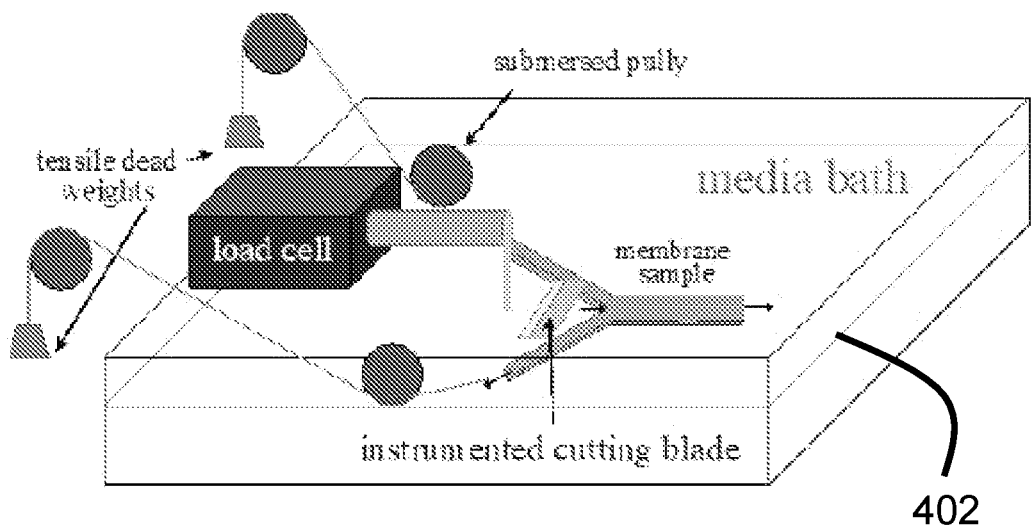
FIG. 4 illustrates a preferred sample holder including a fluid bath for a preferred microscope mounting system for cutting and testing of soft materials in accordance with the invention.

FIG. 4 is a schematic a sample holder for a microscope mounting system for cutting and testing of in-situ biomembranes or other samples that are better tested in fluid. A sample holder 402 includes a volume for a media bath. The modified holder 402 can be used with either of the example preferred mounting systems 100 or 200. A microscope objective would be placed below the razor blade and media bath, directed upward to image the crack tip. The pulleys, load cell, and blade remain stationary with respect to the microscope. The sample (or sample and media bath container together) are translated to the left to cut the sample at a constant rate. The mounting system is particularly useful for biological samples and is preferably used with an inverted microscope. A preferred testing procedure translates the sample at a rate of 1-10 mm/min horizontally toward the blade using an X-Y microscope stage. A maximum load of 0.5 N can be measured with a 1 mN resolution or better at a rate of >20 Hz. Angle between the legs is preferably tunable from 30° to 90° with a precision of ±1°. The horizontal arrangement of the sample permits the media bath, which is not possible with any vertical test arrangement.

Experimental Data and Testing

An experimental prototype consistent with the system of FIG. 1A was assembled and tested with an inverted microscope.

Protocol:

Mechanical Assembly

The mounting system can be constructed using 3D printed, laser cut, and commercial off-the-shelf parts. A detailed list of parts for this example is given in a Table below.

Manufacturing Additional Parts

Tabs 3D print disposable tabs before conducting a test. Two are preferred for each test. Note that these tabs can be reused for non-organic samples but should be disposed of after use with biomaterials.

Razor Blade Clip

The exact dimensions of the required razor blade clip depend on the depth of the razor blade used. Sizes between approximately 20 mm and 8 mm are supported by the exemplary experimental mounting system.

Sample Holder

The sample holder can be redesigned to fit different microscopes/microscope stages. It is preferred that the inner cavity stays at least as large as the one provided, to ensure that the mounting system can use its full range of motion.

Mounting Design

The included mounting platform and frame may be redesigned to fit other microscopes/microscope stages.

Electrical Assembly

Set up the load cell and data acquisition system. Various methods can be utilized but the system preferably will be accurate to less than 1 mN of resolution and be able to collect data at a rate of greater than 20 Hz.

Mounting System Sample Holder Mounting

Replace the original slide/petri dish holder with the custom sample holder.

The custom holder can be modified as needed to match the dimensions of the inset of the microscope stage.

Attach the assembly to the microscope.

Easiest mounting can be achieved using mounting holes on the top surface of the microscope if available. The frame and mounting can be modified as needed to match specific microscopes.

Set the angle of the cut.

Loosen the thumb screw to move the linear slide. Set the angle using the slide and a protractor. Tighten the thumb screw when done.

Set up tensioning mechanism (e.g. a pair of vertical pulleys behind the mounting system).

The sample may be placed in tension by strings that are routed through the mounting system to the back of the mounting system. The strings and weights may be supported from behind the mechanism by suspending them over external pulleys. Other mechanisms for placing in tension are contemplated. For example, one or more tensioning mechanisms may include one, or a combination of, tensioning mechanisms such as spring(s), elastic(s), etc.

Load Cell Mounting

Attach the blade holder to the load cell. The assembly is preferably mounted to the inner slide of the vertical adjust.

Attach the combined system of blade holder, load cell, and inner slide of the vertical adjust into the outer slide of the vertical adjust system that is mounted to the bottom of the angle adjust system.

Micro load cells are fragile. Use caution when handling the load cell to minimize any forces applied to it outside of testing, especially forces in the direction of its load measurement.

Sample Preparation

Sample Dimensions

Prepare a 1.5 cm wide by 7 cm long rectangular sample. These dimensions can be modified, but tests may be required to confirm the sample size is valid for the mounting system and test to work correctly.

Cutting the Legs

Using a razor blade, cut the sample 3 cm lengthwise along the centerline.

Again, this dimension can be modified, but the changes should be tested to confirm they are valid.

Attaching the Tabs

Use adhesive to attach a 3D printed tab to the end of each leg. Because the tabs are 3D printed, they can be modified or reprinted easily.

Preparing the String

Measure and cut two lengths of thin string or fishing line. Approximately 30 cm of string is needed for internal routing through the mechanism; add more as needed to route the string to the external set of pulleys. Attach known weights to the end of each string and tie the other end of each string to the 3D printed tab on each leg.

Strain Measurement Marking

Using marker, place two dots, centered and separated by approximately 1 cm, on each of the thin legs and the thick body of the sample (6 in total).

Sample Mounting

Take caution during this step to ensure that the sample does not touch the microscope objective to avoid damaging it. It may help to adjust the objective and microscope stage to create as much space as possible for sample mounting.

Clamp the base of the sample using the thumb screw in the sample holder.

Route the string for each leg through each side of the pulley system. Take a picture of sample before tension. Make sure the camera is parallel to the sample plane to avoid perspective effects.

Add desired preload weight to the weight holders at the ends of the strings.

Take a picture of sample after weight is added, again making sure the camera is parallel to the sample plane.

Blade Mounting

Place the razor blade into its corresponding holder and secure the blade in place with the tightening screw. Be sure the blade is seated firmly into the blade holder to ensure the blade is square. Slide the razor blade into the blade holder mounted to the load cell.

Mounting System Alignment

Once the blade is in place, focus the microscope on the blade. Align the razor blade to the center of a marker on the microscope software.

Bring the focus of the microscope onto the sample. Using the marker on the microscope software, align the crack tip with the razor blade.

Testing

Start recording data. Translate the sample through the razor blade at a constant velocity. Make a cut at least 1 cm long to obtain sufficient data for analyzing. Stop recording data.

Data Processing

Upload the images from steps 7.2 and 7.3 to an imaging software. Calculate the strain in the sample using the images from before and after loading using the displacement of the dots from unloaded to loaded states. Using a data processing software like MATLAB, calculate the cutting energy.

Discussion of Example:

Calibrating the load cell before use is preferable for acquiring accurate data that can be used to calculate the cutting energy. Once calibrated, the load cell should remain accurate for testing during that session but preferably should be recalibrated every time it is left unused for a long period of time. Any movement of the mounting system can cause the load cell to become uncalibrated which can lead to inaccurate representation of data in the results.

The tensioning mechanism (e.g., the weight used to hold each leg in tension) is preferable to ensure that the test does not fail immediately. Loading the legs with too little force may result in the sample buckling and folding under or in front of the blade instead of being cut. When the legs have too much force applied, the super glue adhesive may fail, causing the tabs to tear from the sample. Another unwanted result of applying too high a force is that the sample may begin to tear due to its tearing energy threshold being exceeded.

While preparing the sample, it is preferable to cut the sample to the correct designated lengths. If the legs are made too long initially, they will run into the pulley system before a long enough cut has been made to acquire sufficient data. Also, if the legs are made too short during preparation, the advantage of the Y-shaped cutting (minimizing the effect of friction to a negligible level) test can be negated.

When preparing the blade and sample for testing, it is preferable to align the blade tip with the crack tip. Using the microscope objective and viewing software, the blade can be centered in the objective's view. Once the blade is aligned, the microscope can be used to focus on the sample. The sample can be moved with the positioning block so that the crack tip is in direct alignment with the blade.

The cutting energy of 131 J/m² acquired using this system is found to be within the range of 133±5 J/m², a range set by previous data from Y-shaped cutting tests on PDMS. The verification of this data proves that this system is valid for calculating the cutting energy of materials. Y-shaped cutting tests can now be conducted to calculate the cutting energy while simultaneously observing the failure of the material near the crack tip through an inverted microscope.

Modifications can be made to allow for the use of this system on different microscopes as well as with different sample holding methods. With the design of the sample holder, alternative methods were created to allow for a petri dish or slide to be placed beneath the sample to protect the microscope objective. These designs can be used when hydration of samples is necessary during testing, without the risk of causing damage to the microscope objective. In addition, the frame can be modified as needed to fit various models of inverted microscopes. The design employs the use of 3D printing so that modifications can be made and implemented efficiently.

Example Data:

Data from a typical test revealed a characteristic high initial force followed by a constant force when steady state cutting has been achieved. To compute the cutting energy, five parameters are needed: sample thickness t. the average loaded strain λ, the preload force $f_A$, the cutting force $f_{cut}$, and the angle between the legs and the cutting axis θ.

$$G_{c,cut} = \frac{2f_A \overline{\lambda}}{t}(1 - \cos\theta) + \frac{f_{cut}\overline{\lambda}}{t},$$

Where the average strain is given by:

$$\overline{\lambda} = \frac{\frac{\lambda_{leg1} + \lambda_{leg2}}{2} + \lambda_{trunk}}{2}$$

Using results obtained with an ultrasharp blade, we calculated a cutting energy of 131 J/m² for PDMS, which is close to the previously obtained cutting energy of 133±5 J/m², validating our test setup. Inconclusive results were found when the blade did not cut the sample correctly, instead riding over the surface. This may occur if the blade's vertical height is not set correctly, or if the preload on the sample is too low. From our tests with dull blades, we found cutting energy values in the range of 140-145 J/m², which are outside the acceptable range of 133±5 J/m² needed to validate the mounting system.

Example 2

Component Overview

There are three main software components, each for one of the following: load cell calibration, data collection, and data processing.

Calibration

The calibration script was an interactive GUI app that lets you collect pairs of (voltage, load) from the load cell, and outputs a slope linearly relating the two.

Data Collection

The data collection script was also an interactive GUI app. It lets you zero the load cell, set up calibration constants, and view data in real time. It can also dump output data to a text file.

Data Processing Script

This script reads an output file of collected data, trims the data (not automatic), and computes the cutting energy.

1. Mechanical Assembly:
1.1 BOM and Assembly instructions:
A detailed list of components is given in the Table below.
2.0 Disposable/Swappable Parts:
2.1 Disposable Tabs:
The mounting system uses disposable 3D printed tabs to hold on to the sample. These are attached with superglue (or some other suitable adhesive). These were printed on "fine" setting in Cura (0.1 mm layer height), with no brim.
2.2 Razor Blade Holder:
The exact dimensions of the required razor blade clip depend on the depth of the razor blade used. Sizes between approximately 20 mm and 8 mm are supported by the mounting system. 3D printing is favored for making the blade holder.
Before conducting a test, it preferable to ensure the blade holder fits in its slot on the load cell. It should be loose enough to slide in easily by hand, but not have any play.
2.3 Sample Holder:
The sample holder can be redesigned to fit different microscope stages. The internal space should be kept the same size.
3.0 Mounting the Mounting system:
3.1: Place the sample holder in microscope stage in place of the original slide/petri dish holder.
3.2: Attach assembly to microscope
3.3 Set the angle of the cut. Loosen the thumb screw to move the linear slide.
Set the angle using the protractor. Tighten the thumb screw when done.
3.4: Set up a pair of vertical pulleys. The sample may be placed in tension by strings that are routed through the mounting system to the back of the mounting system. It will need to be supported from behind the mechanism. The sample may also be placed in tension by one or more tensioning mechanisms, such as a spring, elastic polymer, or other mechanism.
4.0 Prep the Sample:
4.1 Sample Dimensions:
The mounting system is preferably set up to work with approximately 1.5 cm wide, 7 cm long sample.
4.2 Cutting the Legs:
Use a razor blade or sharpened object to cut a 3 cm slit down the middle of the sample lengthwise. Glue one clip to each thin leg of the cut sample.
NOTE: The length of this slit can be adjusted. 3 cm slit gives about 1.5 cm of cutting travel; increasing the slit length gives less cutting travel, decreasing it gives more cutting travel (up to a point).
4.3 Attaching the tabs:
Attach one disposable tab to each thin leg of the sample with an adhesive.
4.4 Prep the String:
Prepare two lengths of 75 cm long line. Tie weight holders to one end of each string and tie the other ends to the D-shaped ring on the tabs.
4.5 Strain Measurement Marking
Mark the two thin legs and the thick leg of the sample, on their mid-line and 1 cm apart.
5.0 Mounting the sample
5.1 Insert sample holder
Place the sample holder into its position on the microscope stage.
5.2 Clamp sample:
Clamp the wide leg of the sample in the sample holder securing it with the thumb screw.
Take care not to touch the microscope objective with your hands or sample. It may help to move the objective and/or stage so they are clear of each other.
5.3 Route the string for each leg through each side of the pulley system.
5.4 Take a picture of sample before tension.
5.5 Add desired preload weight to weight holders.
5.6 Take a Picture of Sample after weight is added.
7.0 Calibrate the Load Cell.
7.1 The calibration process can include putting different known weights on the load cell and recording the voltage readings. Starting with zero weight (the default), wait for the voltage readout to settle, and press the "Take Sample" button. For subsequent samples, edit the "Weight" field to match whatever additional weight is being placed on the load cell, wait for the graph to settle, and then press the "Take Sample" button.
7.2 Once enough data points have been collected, copy the computed slope out of the slope cell.
8. Set up razor blade.
8.1 Place the razor blade into its clip and secure the blade in place with the screw.
8.2 Slide the razor blade into the blade holder mounted to the load cell. Place it against the wall on the inside of the clamp to keep it square.

8.3 Install the blade and blade holder into the rest of the mounting system.
9.0 Alignment
9.1 Once the blade is in place, focus the microscope on the blade.
9.2 Align the razor blade to the center of a marker on the microscope software.
9.3 Bring the focus of the microscope onto the sample.
9.4 Using the center marker, align the crack tip with the razor blade.
10.0 Run the test
10.1 Start the data collection Data Post-Processing:
To calculate cutting energy five parameters can be used: Sample thickness, average strain, cutting force, preload force, and cutting angle.
Calculate the average strain using strain measurement dots applied to eh sample and from pictures taken.
Sample thickness can be measured. All parameters can be stored to be analyzed.
There is little maintenance that needs to be done on this mounting system. 3D printed parts can be reprinted as needed if they break or are contaminated beyond cleaning Parts that are contaminated with glue or biomaterial can be cleaned and reused, or simply replaced.

| Material/Equipment | Company | Catalog Number | Comments/Description |
|---|---|---|---|
| 1' OD Pulley | McMaster Carr | 3434T75 | Pulley for Wire Rope (Larger) |
| 100 g Micro Load Cell | RobotShop | RB-Phi-203 | |
| 1K Resistor | Digi-Key | CMF1.00KFGCT-ND | 1k Ohms +/− 1% 1 W Through Hole Resistor Axial Flame-Retardant Coating, Moisture Resistant, Safety Metal Film |
| 1M Resistor | Dig-Key | RNF14FAD1M00 | 1 MOHms +/− 1% .25 W, ¼ W Through Hole Resistor Axial Flame-Retardant Coating, Safety Metal Film |
| 3/8' OD Pulley | McMaster Carr | 3434T31 | Pulley for Wire Rope |
| 4' Clear Protractor with Easy Read Markings | S&S Worldwide | LR3023 | |
| Breadboard | ECEB | N/A | |
| IC OPAMP ZERO-DRIFT 2 CIRC 8DIP | Digi-Key | LTC1051CN8#PBF-ND | |
| M2 × .4 mm Nut | McMaster Carr | 90592A075 | Steel Hex Nut |
| M2 × .4 mm × 25 mm | McMaster Carr | 91292A032 | 18-8 Stainless Steel Socket Head Screw |
| M2 × .4 mm × 8 mm | McMaster Carr | 91292A932 | 18-8 Stainless Steel Socket Head Screw |
| M3 × .5 mm × 15 mm | McMaster Carr | 91290A572 | Black-Oxide Alloy Steel Socket Head Screw |
| M3 × .5 mm × 16 mm | McMaster Carr | 91294A134 | Black-Oxide Alloy Steel Hex Drive Flat HeadScrew |
| M3 × .5 mm, 4 mm High | McMaster Carr | 90576A102 | Medium-Strength Steel Nylon-Insert Locknut |
| M4 × .7 mm Nut | McMaster Carr | 90592A090 | Steel Hex Nut |
| M4 × .7 mm × 15 mm | McMaster Carr | 90592A306 | Black-Oxide Alloy Steel Socket Head Screw |
| M4 × .7 mm × 16 mm | McMaster Carr | 91294A194 | Black-Oxide Alloy Steel Hex Drive Flat HeadScrew |
| M4 × .7 mm × 18 mm | McMaster Carr | 91290A164 | Black-Oxide Alloy Steel Socket Head Screw |
| M4 × .7 mm × 20 mm | McMaster Carr | 91290A168 | Black-Oxide Alloy Steel Socket Head Screw |
| M4 × .7 mm × 20 mm | McMaster Carr | 92581A270 | Steel Raised Knurled-Head Thumb Screw |
| M4 × .7 mm × 30 mm | McMaster Carr | 91282A172 | Black-Oxide Alloy Steel Socket Head Screw |
| M4 × .7 mm × 50 mm | McMaster Carr | 91290A193 | Black-Oxide Alloy Steel Socket Head Screw |
| M4 × .7 mm, 5 mm High | McMaster Carr | 94645A101 | High-Strength Steel Nylon-Insert Locknut |
| M5 × .8 mm Nut | McMaster Carr | 90592A095 | Steel Hex Nut |
| M5 × .8 mm × 16 mm | McMaster Carr | 91310A123 | High-Strength Class 10.9 Steel Hex HeadScrew |
| M5 × .8 mm × 35 mm | McMaster Carr | 91290A195 | Black-Oxide Alloy Steel Socket Head Screw |
| M5 × .8 mm, 13 mm Head Diameter | McMaster Carr | 96445A360 | Flanged Knurled-Head Thumb Nut |
| M5 × .8 mm, 5 mm High | McMaster Carr | 90576A104 | Medium-Strength Steel Nylon-Insert Locknut |
| Wiring Kit | ECEB | N/A | |
| XYZ Axis Manual Precision Linear Stage 60 × 60 mm Trimming | OpticsFocus | N/A | |

| Material/Equipment | Company | Catalog Number | Comments/Description |
|---|---|---|---|
| Bearing Tuning Platform Sliding Table | | | |

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A microscope mounting system for cutting and testing of soft materials, comprising:
   a sample holder shaped and configured to fit a horizontal microscope stage of a microscope and fix one end of a soft material sample;
   a blade holder configured to position a cutting blade and connect directly or eventually to either the microscope or to a frame of the microscope;
   a load measurement device configured to determine a load applied to the cutting blade;
   a precision adjustment assembly configured to set positioning of the cutting blade in the horizontal x-y plane and the z vertical plane such that a cutting edge of the cutting blade can be positioned at a focal point of the microscope;
   at least two grips configured to grip a second end of the soft material sample at at least two discrete locations on opposite sides of the cutting blade when the blade contacts the soft material sample at the focal point; and
   a tension mechanism to apply tension in the x-y plane to each of the at least two grips.

2. The microscope mounting system of claim 1, wherein the at least two grips are at first ends of at least two lines, and the tension mechanism comprises an arm for each of the at least two lines that mounts a pulley for each of the two lines, the pulley being arranged such that tension is applied to each of the at least two grips in the x-y plane.

3. The microscope mounting system of claim 2, comprising an equal weight attached to second ends of the at least two lines, and additional pulleys arranged such that the equal weight hangs vertically from the second ends of the at least two lines.

4. The microscope mounting system of claim 3, wherein the tension mechanism is supported by the precision adjustment assembly.

5. The microscope mounting system of claim 4, wherein the precision adjust system comprises an angle adjustment mechanism that adjusts the angular position of the arm for each of the at least two lines.

6. The microscope mounting system of claim 2, wherein the precision adjust system comprises an angle adjustment mechanism that adjusts the angular position of the arm for each of the at least two lines.

7. The microscope mounting system of claim 6, wherein the angle adjustment mechanism comprises a slide and pivot assembly configured to pivot the arm for each of the at least two lines an equal amount above a pivot point in response to movement of a slide in a slot.

8. The microscope mounting system of claim 6, wherein the angle adjustment mechanism comprises:
   a platform defining a plurality of fixed positions distributed symmetrically along a curved path; and
   a support integrated with the arm for each of the at least two lines that is configured to move along the curved path and be fixed into a set of the plurality of fixed positions.

9. The microscope mounting system of claim 8, wherein the support integrated with the arm for each of the at least two lines has a portion above the platform with the arm being below the platform.

10. The microscope mounting system of claim 1, wherein the load measurement device comprises a load sensor that mechanically measures the load applied to the cutting blade.

11. The microscope mounting system of claim 1, wherein the load measurement device comprises an optical sensor that images the cutting blade and determines stress as a function of blade radius.

12. The microscope mounting system of claim 1, wherein the sample holder comprises a media bath configured to submerse the sample and at least a portion of the cutting blade.

13. The microscope mounting system of claim 1, wherein the tension mechanism limits any z component of tension to a tiny fraction of x and y components of tension.

14. The microscope mounting system of claim 13, wherein the tiny fraction is small enough to maintain focus of the sample during the cutting and testing.

15. The microscope mounting system of claim 1, wherein the tension mechanism applies substantially equal tension in the x-y plane to each of the at least two grips.

16. The microscope mounting system of claim 15, wherein the substantially equal tension is applied at an equal angle from the cutting edge.

17. A microscope mounting system for cutting and testing of soft materials, comprising:
   a sample holder shaped and configured to fit a horizontal microscope stage of a microscope and fix one end of a soft material sample;
   a blade holder configured to position a cutting blade and connect directly or eventually to the microscope or a frame of the microscope;
   means for measuring load applied to the cutting blade; and
   means for Y-shaped cutting of the soft material sample and for applying substantially equal tension in the x-y plane to at least two legs of the soft material during cutting by the cutting blade.

* * * * *